United States Patent [19]

Schluderberg

[11] Patent Number: 4,530,814
[45] Date of Patent: Jul. 23, 1985

[54] APPARATUS FOR SUPERHEATING STEAM

[75] Inventor: Donald C. Schluderberg, Lynchburg, Va.

[73] Assignee: The Babcock & Wilcox Company, New Orleans, La.

[21] Appl. No.: 377,721

[22] Filed: May 13, 1982

[51] Int. Cl.³ .................. G21C 15/16; G21D 5/16
[52] U.S. Cl. .................. 376/317; 376/402; 122/478; 122/483; 122/491; 122/488
[58] Field of Search ........... 376/317, 402, 408, 405, 376/406; 122/488, 491, 467, 478, 483; 165/110

[56] References Cited

U.S. PATENT DOCUMENTS

| 1,759,011 | 5/1930 | Huet . | |
| 3,309,282 | 3/1967 | Maldague | 376/317 X |
| 3,575,002 | 4/1971 | Vuia | 376/317 |
| 3,656,281 | 4/1972 | Bansal et al. | 122/488 X |
| 3,886,748 | 6/1975 | Bronicki | 165/110 X |
| 3,979,914 | 9/1976 | Weber | 60/644 |
| 4,048,012 | 9/1977 | George et al. | 376/317 X |
| 4,248,181 | 2/1981 | Bessouat et al. | 122/483 |
| 4,302,227 | 11/1981 | Miller | 122/491 X |

FOREIGN PATENT DOCUMENTS

| 2703024 | 7/1978 | Fed. Rep. of Germany . |
| 0542101 | 8/1922 | France . |
| 0316804 | 8/1929 | United Kingdom . |
| 0679083 | 9/1952 | United Kingdom . |
| 1461660 | 1/1977 | United Kingdom . |

OTHER PUBLICATIONS

"The Separately Fired Superheater-A Nuclear Application at Indian Point", McCormick et al., AS-ME-IEEE Nat. Power Conf., Albany, N.Y., Sep. 1965, pp. 1-16.

"Design and Operating Experience with Moisture Separator Reheaters for Nuc. Steam Turbines", Moore, GE Seminar, Colonie, N.Y., Oct. 1980, pp. 1-14.

HTFS Handbook, "Tube Side Condensers", Section CE4, Smith, Jan. 1980.

HTFS Handbook, "Gas Phase Resistance Effects in Condensation", Section CP5, Butterworth, Dec. 1979.

HTFS Handbook, "Correlation for Flooding in Vertical Tubes", Section TM11, Hewitt, Nov. 1977.

HTFS Handbook, "Flooding Phenomenon in Two Phase Flow", Section TP8.

Hudson Products Corporation, Advertisement for Hudson Stac-Flo Steam Condensers.

Primary Examiner—Richard E. Schafer
Assistant Examiner—Daniel Wasil
Attorney, Agent, or Firm—James C. Simmons; Robert J. Edwards

[57] ABSTRACT

Apparatus for superheating steam. In accordance with one aspect of the invention, the apparatus is provided with two banks of inclined tubes extending upwardly from an outlet header to respective inlet headers. The banks of tubes are disposed in the flow path of main steam through the apparatus and provide a flow of vapor for adding superheat to the main steam. In accordance with another aspect of the invention, the tubes extend upwardly to closed ends whereby a lower header acts as both a vapor inlet and condensate outlet. In accordance with another aspect of the invention, the vapor is provided by a fossil fuel-fired vapor generator to superheat main steam which has been provided by a nuclear steam generator.

13 Claims, 9 Drawing Figures

APPARATUS FOR SUPERHEATING STEAM

This invention relates to apparatus for superheating steam.

In a conventional nuclear or non-nuclear steam power plant, heat supplied by a reactor core, combustion of fuel, or other means is used to raise the temperature of water until steam at saturation temperature is provided. This saturated steam is then superheated to a desired number of degrees of superheat by means of heat from the same source so that it is at a condition suitable for delivery to a steam turbine. After the steam has performed work as it is expanded through a high pressure turbine, it is generally desirable to deliver it to a low pressure turbine to further expand it as it performs additional work. However, in many such power plants, the steam leaving the high pressure turbine may be at a condition less suitable for delivery to the low pressure turbine without first removing moisture therefrom and reheating it. A moisture separator-reheater is commonly provided between a high pressure and a low pressure turbine to increase the plant efficiency and also protect the turbine blades of the low pressure turbine by reducing moisture in the steam which is to be expanded in the low pressure turbine. The reheater for a fossil power plant may be located within the steam generator and heat supplied by combustion of fuel in the steam generator is thus utilized to reheat the steam to a desired degree of superheat. Throttle steam or steam extracted from the high pressure turbine may also be used to reheat the main steam after it has been exhausted from the high pressure turbine. Likewise in a nuclear power plant, heat supplied by the reactor core may be used to reheat the steam before it is provided to a lower pressure turbine.

Current pressurized water reactor steam cycles utilize modest amounts of superheat such as about 30° to 60° F. (17° to 33° C.) for steam delivered to the high pressure turbine and modest amounts of reheat such as about 100° F. (56° C.) of superheat for steam delivered to the low pressure turbine in order to improve heat rate for greater power output and reduced turbine blade maintenance which would otherwise be required of a greater amount of moisture in the steam. It is considered desirable to increase the number of degrees of superheat of steam delivered to the high pressure and low pressure turbines to further reduce moisture therein and to increase plant efficiency.

Operators of nuclear power plants may sometimes find that use of electricity has increased over the years such that the power output thereof is less than the power required. Rather than constructing a new power plant, they have increasingly asked whether there is a way to increase the output of the plant in such situations especially when excess turbine generator capacity exists.

Moisture separator-reheaters for steam power generation typically employ large cylindrical shells containing moisture separators and heat transfer tubes extending therethrough. The separators are typically of an inertial type and separate water from wet steam exhausted from the high pressure turbine. This steam is then directed to the heat exchange portion of the unit. The heat transfer tubes of the heat exchange portion may employ throttle steam and/or extraction steam to reheat the main steam flow. The water separated from the main steam is then drained at the bottom of the unit while the dried and reheated main steam is directed to the low pressure turbine.

A common problem with horizontally disposed moisture separator-reheaters is unequal heat transfer and flow oscillations. The lowermost tubes of a tube bundle are subjected to a high temperature differential while tubes high in a tube bundle receive shell side flow which has already been partially heated by the lower tubes. As a result, the lower tubes may tend to accumulate water until they no longer carry steam along their entire length. Subcooling of the water in the lower tubes may then occur while steam may pass through the entire length of the tubes higher up in the bundle. Such occurrences may create an unstable condition which results in reduced overall heat transfer and potentially damaging cyclical thermal stresses on the tubes and tube sheets.

One proposal for solving this problem has involved employing larger diameter tubes at the bottom of a tube bundle and smaller diameter tubes at the top thereof. Design of individual tubes sizes for such an arrangement is difficult and some tubes may be designed too large and other tubes may be designed too small resulting in perhaps even less flow stability. In addition, such an arrangement results in greater expenses for design and construction since varying tubes sizes are required.

Another proposal directed to this problem provides in a water separator-superheater structure a plurality of horizontally disposed netting mattresses arranged in superposed stepped relation through which the main steam passes to be dried after which it passes through a single bank of heat exchange tubes which are disposed at an inclined angle in order to promote self-draining. An inlet header is provided at the upper end of the tubes and an outlet header is provided at the lower end of these tubes. Such an arrangement does not utilize the available space to provide heat transfer surface as effectively as may be desired. It is therefore desirable to more effectively utilize the available space within the shell of a moisture separator-reheater to provide a greater heat transfer area therein while also providing adequate means for separating moisture from the steam.

Other proposals for solving this problem have included the use of inlet flow control orifices in each tube and the deliberate passage of excess steam through each tube. Although these methods are in some instances reasonably successful in controlling the tendency for tube flow oscillation, the flow orifices reduce steam pressure in the tubes and thus result in less efficient operation. In addition, the flow orifices cannot adjust to the effects of shell side flow changes caused by tube bowing, bundle bowing, or side baffle misalignment. On the other hand, the use of excess steam passage through each tube constitutes a power loss which is also undesirable.

It is, therefore, an object of an aspect of the present invention to provide increased output for a nuclear power plant which has excess turbine-generator capacity.

It is another object of an aspect of the present invention to provide a peak load or power upgrade device for nuclear power plants.

It is a further object of an aspect of the present invention to increase the thermal efficiency of a nuclear power plant.

It is still another object of an aspect of the present invention to provide a moisture separator-superheater which more efficiently utilized the heat provided in the reheating steam for more efficient operation thereof.

It is yet another object of an aspect of the present invention to reduce the possibility of radiation contamination of such a superheater and of a separately fired vapor generator supplying vapor thereto.

It is yet another object of an aspect of the present invention to provide such a superheater which more effectively utilizes the available space within the superheater for providing heat transfer surface.

It is still another object of an aspect of the present invention to simplify and reduce the expense of fabrication of such a moisture separator-superheater.

It is another object of an aspect of the present invention to reduce the power loss which would otherwise result from a large pressure drop of the main steam as it passes through a moisture separator-superheater.

The above and other objects, features, and advantages of this invention will be apparent in the following detailed description of the preferred embodiments thereof which is to be read in connection with the accompanying drawings.

Figure 1:
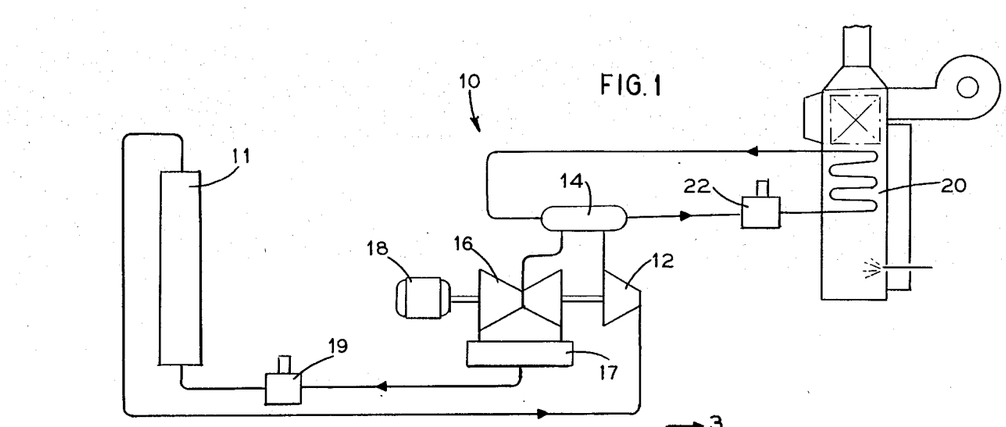
FIG. 1 is a shematic of a portion of a nuclear power plant embodying this invention.

Referring to FIG. 1, there is illustrated a portion of a nuclear power plant 10 wherein steam is supplied from a conventional nuclear steam generator 11 to a high pressure turbine illustrated at 12 (hereinafter referred to as "HP turbine"). After expansion of this main steam through the HP turbine 12 to perform work, it is exhausted to an apparatus for superheating steam such as the moisture separator-reheater illustrated at 14 for removal of moisture therefrom and for reheating the main steam prior to its discharge to a lower pressure steam turbine illustrated at 16 (hereinafter referred to as "LP turbine"). After expanding through the LP turbine 16 while doing work, the main steam is exhausted to a condenser 17 for condensing thereof, and the condensate is then returned via feed pump 19 and other conventional apparatus such as feed water heaters (not shown) to the nuclear steam generator 11 whereby the steam cycle is repeated with the addition of heat to produce the main steam and the return of the main steam to the HP turbine 12. The HP and LP turbines 12 and 16 respectively provide power output such as through means of an electrical generator illustrated at 18. Although only two steam turbines are illustrated in FIG. 1, the power plant may have more than two such turbines and an apparatus for superheating steam may be provided in the flow path of steam between any two successive turbines in accordance with this invention. For example, the power plant may also be provided with an intermediate pressure steam turbine.

The output of a nuclear plant may be increased where excess turbine-generator capacity exists if reactor supplied heat which is normally used to reheat the main steam is instead utilized for increasing the number of degrees of superheat of the main steam to perform additional work in the HP turbine and heat from another source is provided to reheat the main steam before its delivery to the LP turbine. Since the expense of a nuclear reactor is such that it is desirable to make maximum use of it, in order to provide such increased output in accordance with one aspect of this invention, the moisture separator-reheater 14 is supplied with vapor such as steam from a separately fired vapor generator such as the steam generator illustrated at 20 for transferring heat to the main steam as it passes through the heat exchange apparatus 14. This steam generator 20 is separately fired in order not to utilize any of the heat supplied by the nuclear reactor whereby the steam generator 20 may function as a peak load or power upgrade device with maximum use being made of the reactor supplied heat to increase the power output of the plant when excess turbine-generator capacity exists. Inotherwords, in cases where the HP turbine has sufficient capacity to handle all of the main steam which can be provided by the nuclear steam generator, then additional heat may be added to the main steam by a separately fired steam generator 20 before its passage through the LP turbine 16 for even greater power output than could otherwise be provided by the nuclear reactor itself.

In order to reduce the possiblity of radiation contamination in reheater 14 and the separately fired vapor generator 20, which may otherwise be caused by contamination of nuclear generated steam passing through reheater 14 by fuel clad leaks or nuclear steam generator tube leaks, the steam generator 20 for providing reheat vapor to the reheater 14 is fossil fuel-fired. For the purposes of this specification and the claims, a "fossil fuel-fired vapor generator" is defined as a non-nuclear vapor generator and is meant to include any of the various non-nuclear vapor generators which burn various fossil fuels such as, for example, oil, gas, coal, and coal-water mixtures, and is also meant to include vapor generators supplied with heat from such non-nuclear energy sources as solar and geothermal. After the vapor has given up heat to the main steam in the moisture separator-reheater 14 and has condensed as it passes through the tubes thereof, it is returned to the fossil fuel-fired steam generator 20 such as by means of the feed pump illustrated at 22 so that additional heat may be added to it for its return to the moisture separator-reheater 14, and the cycle is repeated.

The steam supplied by many fossil fuel-fired vapor generators 20 can be provided at a higher pressure than the pressure of steam which may otherwise be provided by a conventional nuclear steam generator for reheating the main steam to thereby provide a higher reheat temperature. For example, a fossil fuel-fired vapor generator providing saturated steam at 650° F. (343° C.) should be able to reheat main steam from a high pressure turbine from around 380° F. (193° C.) to more than 600° F. (316° C.) However, many conventional nuclear steam generators are not designed to provide reheat saturated steam having a temperature above about 510° F. (266° C.).

Figure 2:
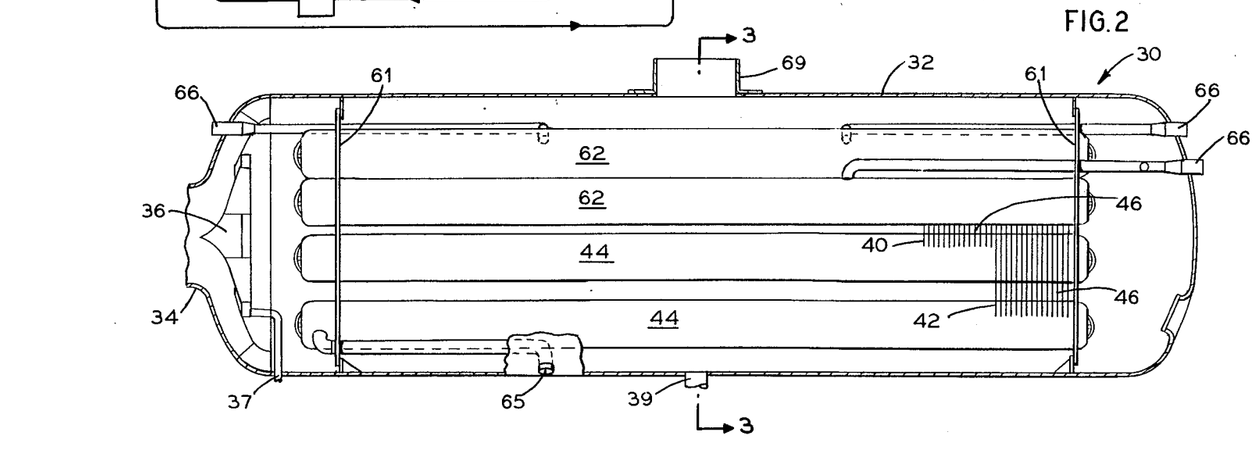
FIG. 2 is a partially schematic side elevation view with the shell sectioned to show the arrangement of the internals of an apparatus for superheating steam embodying one aspect of this invention.
Figure 3:
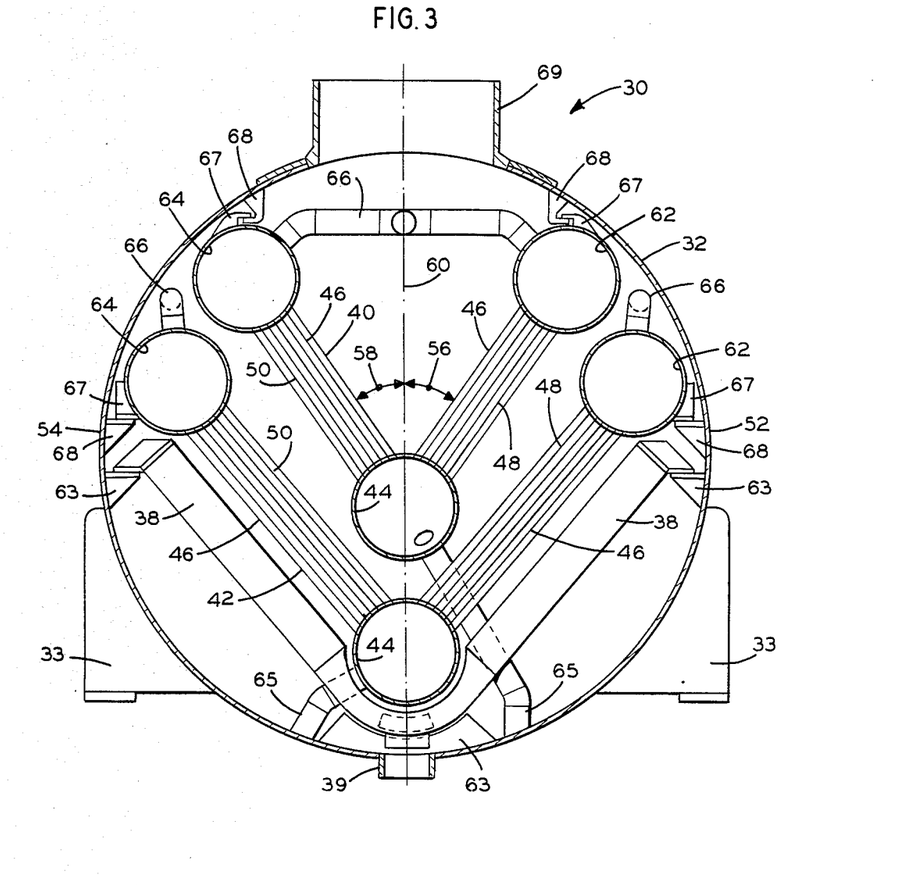
FIG. 3 is an enlarged sectional view, partially schematic, thereof taken along line 3—3 of FIG. 2.

Referring to FIGS. 2 and 3 there is shown an apparatus for superheating steam which is indicated generally at 30. This apparatus 30 is a preferred embodiment of the heat exchange apparatus which is illustrated at 14 in FIG. 1. Apparatus 30 is provided with an elongate, horizontally disposed, generally cylindrical shell 32 supported by members 33. A main steam inlet 34 opens into the shell 32 to supply steam to be superheated, such as steam exhausted from HP turbine 12 in FIG. 1 which is to be reheated before its delivery to LP turbine 16. In accordance with one aspect of this invention, a diffuser separator 36 is provided at the main steam inlet 34 to use the velocity head of the incoming steam to remove a major portion of the entrained moisture which is then drained from the apparatus 30 through line 37. For example, a moisture content of 10 to 12 percent may be reduced to a level in the neighborhood of 1 to 2 percent utilizing the energy that would otherwise be lost at the inlet 34 to the apparatus 30. In addition, it is believed that the diffuser separator 36 may actually recover a portion of the velocity head normally lost to yield a pressure rise of perhaps ½ lb. per sq. in. (0.04 kg. per sq. cm.) to thereby reduce the power loss which would otherwise result as the main steam passes through the apparatus 30.

The moisture which is not separated from the main steam requires additional steam to evaporate it thus resulting in added power loss, and its impingement on reheater tubes is a cause of tube temperature oscillation. In addition to carrying solids into the lower pressure turbine, such moisture contains solids which tend to foul the reheater tubes thereby further reducing heat transfer, increasing pressure drop, and requiring more down-time for cleaning. Therefore, in order to separate substantially all of the remaining moisture from the steam, a group of secondary separators 38 using corrugated scrubber plates is also provided in the path of the main steam through the apparatus 30. This separated moisture is then drained from the apparatus 30 through line 39. It should be readily apparent from viewing the arrangement of components within the shell in FIG. 3 that these separators 36 and 38 take up only a small percentage of the available space within the shell 32 thus leaving space therein to provide increased heat transfer surface.

Apparatus 30 is provided with at least one bundle of tubes such as high pressure bundle 40 of tubes which may be supplied with heating vapor from such sources as turbine throttle steam or from a fossil fuel-fired steam generator. A low pressure bundle 42 of tubes is also preferably provided which may use extraction steam so that the amount of throttle steam required for the high pressure bundle may be reduced for improvement in power output, or it also may use steam from a fossil fuel-fired steam generator. When the low pressure tube bundle of a conventional reheater which has flow control devices is supplied with extraction steam, its drains may, due to pressure drop of the reheat steam in its passage through the reheater tubes, have to be routed to a lower pressure feed water heater than the feed water heater to which the drains could have otherwise been directly routed. However, since there should be very little pressure drop of the reheat steam in its passage through the reheater tubes when extraction steam is supplied to the low pressure tube bundle 42 of the present invention, its drains may be routed, for increased efficiency of the plant, to the same feed water heater as the extraction steam could have been routed otherwise.

Each of the tube bundles 40 and 42 is provided with an outlet header 44 from which extends drain line 65. Each drain line 65 is routed at illustrated in FIG. 2 to provide some flexibility of movement to allow for expansions and contractions of the respective tube bundles. Each outlet header 44 extends generally longitudinally of heat exchange apparatus 30 and is located preferably about midway between the sides thereof and generally below mid-height of the shell. The tubes illustrated schematically at 46 of the tube bundles 40 and 42 open into and extend in an upwardly direction from the respective outlet header 44 and are inclined. Preferably, these tubes 46 are disposed to lie substantially parallel to a plane which is perpendicular to the longitudinal axis of the shell. FIG. 3 is a view taken is such a plane.

In order to utilize the available space within the apparatus 30 for providing greater heat transfer surface than if each tube bundle 40 and 42 consisted of only one bank of tubes and thereby reduce shell-side pressure drops and terminal temperature difference to provide higher main steam temperature at the outlet from the apparatus 30 in accordance with the present invention, each tube bundle 40 and 42 is comprised of two banks 48 and 50 of tubes extending from the respective outlet header 44 in generally the configuration of a "V" as viewed in a cross-section of the apparatus 30 taken in a plane perpendicular to the longitudinal axis thereof as shown in FIG. 3. Inotherwords, a first bank 48 of tubes extends from the respective outlet header 44 in a direction upwardly and outwardly toward one side 52 of the shell 32 on one side of the vertical longitudinal centerplane 60 of the shell, and a second bank 50 of tubes extends upwardly and outwardly from the respective outlet header 44 to the other side 54 of the shell. In a view taken in a plane perpendicular to the longitudinal axis of the shell, as shown in FIG. 3, the angle illustrated at 56 at which each of the tubes 46 of the first bank 48 extends relative to the vertical longitudinal centerplane 60 of the apparatus 30 is opposed to the angle illustrated at 58 at which each of the tubes of the second bank extends relative to the centerplane 60. The particular angle at which each of these tubes 46 extends is not critical to this invention. However, an angle in the range of around 30 to 60 degrees is believed to effectively utilize the space available within the shell and provide adequate inclination of the tubes. The tubes 46 of the first blank 48 terminate at and open into a first inlet header 62 which is preferably adjacent the shell 32 on one side of the centerplane 60 thereof, and the tubes 46 of the second bank 50 terminate at and open into a second inlet header 64 which is preferably adjacent the shell 32 on the other side of the centerplane 60.

As shown in FIG. 2, each of the headers 62 and 64 extends in a direction substantially parallel to the longitudinal axis of the shell 32. The outlet header 44 of the high pressure bundle 40 of tubes is disposed above the outlet header 44 of the low pressure bundle 42 of tubes, and each of the inlet headers 62 and 64 thereof is disposed above respective inlet headers 62 and 64 of the low pressure bundle 42 of tubes.

The inlet headers 62 and 64 are connected through lines 66 to a source or sources of vapor such as steam from a fossil fuel-fired steam generator, turbine extraction steam, or throttle steam to provide heating steam to the inclined tubes 46 of the tube bundles. These tubes 46 are short (they generally do not extend in a longitudinal direction of the shell 32) and inclined, to quickly drain condensate over a short distance by gravity to thus provide a means for condensing the steam in the tubes without sub-cooling it and to thereby provide more efficient heat transfer and greater power output. By a "short tube" is meant a tube the length of which is less than the shell diameter of the heat exchanger in which the tube is located. The shell diameter is measured in a plane perpendicular to the longitudinal axis of the heat exchanger. However, it is recognized that a negligible amount of sub-cooling may occur. Condensate collecting in each of the outlet headers 44 may then be removed by draining it to respective vented drain tanks or by other suitable means through drain lines 65 after which it may be returned to the main steam cycle or to the fossil fuel-fired steam generator for reheating is previously described.

In order to increase resistance to damage from violent temperature transients, each of the tube bundles 40 and 42 is supported at each respective upper inlet header 62 and 64 by a member 67 attached thereto which is supported by a member 68 attached to the shell 32. A portion of each member 67 is slideably supported by a portion of the respective member 68 to allow for expansions and contractions of the inlet headers 62 and 64. Each of the lower outlet headers 44 is suspended from the respective upper headers 62 and 64 by the respective tube banks 48 and 50 to allow for expansions and contractions of the tubes 46 and outlet headers 44.

The secondary moisture separators 38 are disposed in the steam path between the primary separator 36 and the low pressure bundle 42 of tubes and are slidably supported by members 63 to allow for expansions and contractions. After passing through the primary separator 36 at the steam inlet 34, the main steam passes through the secondary separators 38 on one side or the other of the outlet headers 44 after which it passes upwardly and between the outlet headers 44 and respective inlet headers 62 and 64 and over the inclined tubes 46 whereby heat is exchanged from the heating steam in the inclined tubes 46 to the main steam after which the resulting dried and superheated main steam continues to pass upwardly and is discharged at an outlet illustrated at 69 which is disposed at the top of the apparatus 30. The main steam is then routed to a steam turbine such as LP turbine 16 in FIG. 1 for use therein.

Baffles 61 may also be provided at suitable locations for regulation of steam flow through the reheater 30. The headers 44, 62, and 64 extend through apertures in the baffles 61 which apertures provide sufficient clearance to allow for differential motion between the baffles and headers during expansions and contractions. However, such clearances which are perhaps one-sixteenth to one-eighth inch (about 2 to 3 mm.), allow steam flow through the apertures which results in reduction of efficiency of the reheater 30. In order to reduce such steam flow, plates (not shown) which are anchored to the respective headers and which overlap the respective apertures are provided adjacent and parallel to the respective baffles.

Figure 4:
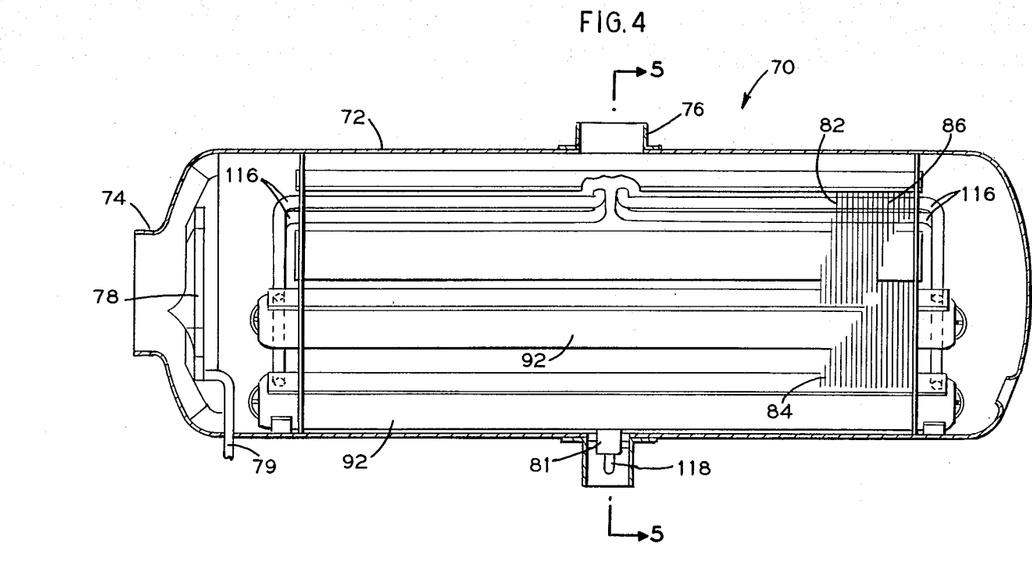
FIG. 4 is a side elevation view similar to that of FIG. 2 of an alternative embodiment of this invention.
Figure 5:
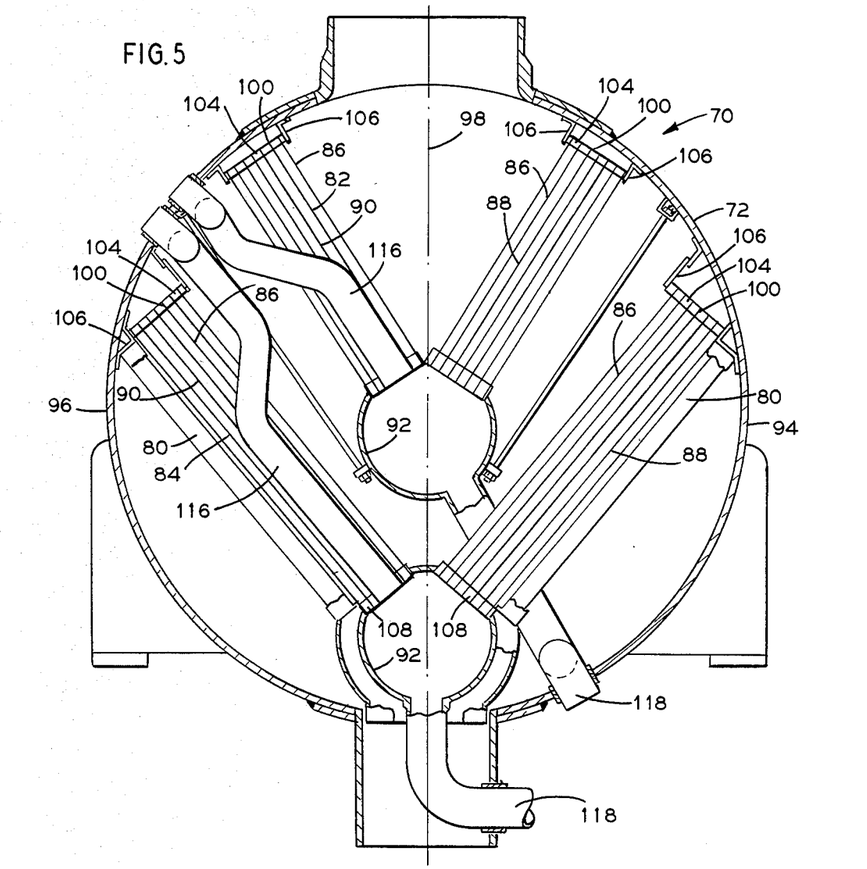
FIG. 5 is an enlarged sectional view, partially schematic, thereof taken along line 5—5 of FIG. 4.

Referring to FIGS. 4 and 5, there is shown an alternative embodiment of apparatus for superheating steam indicated generally at 70. This heat exchange apparatus 70 may also be used as the reheater illustrated at 14 in FIG. 1. Apparatus 70 is provided with a horizontally disposed generally cylindrical shell 72 having a main steam inlet 74, a main steam outlet 76, a primary separator 78, a primary separator drain 79, secondary separators 80 and secondary separator drain 81 similar to those provided in the apparatus 30 of FIGS. 2 and 3. Two bundles 82 and 84 of tubes 86, each bundle provided with two banks 88 and 90 of tubes 86 extending in a "V" configuration from a respective lower header 92, are also provided. Each lower header 92 is positioned approximately midway between the sides 94 and 96 of the shell 72 and the tubes 86 extend upwardly and outwardly therefrom to locations on respective sides of the vertical longitudinal centerplane 98 of the shell which are adjacent the shell 72. However, in this embodiment, each lower header 92 serves as both a heating steam inlet header and a condensate outlet header. Rather than extending upwardly and opening into another header, the tubes 86 of each bank 88 and 90 extend upwardly and terminate at closed ends in order to eliminate the expense of providing additional headers and of providing joints between the tubes and headers that would otherwise be required, to increase available room for corrugated scrubbers, and to permit the use of longer tubes in each tube bank 88 and 90 whereby the number of tube-to-header joints may be even further reduced since a lesser number of tubes would thus be required. Such a construction is also provided to simplify fabrication, inspection, and maintenance of the apparatus 70. The upper closed ends 100 of the tubes 86 are inserted in apertures 102 in support plates 104. Support plates 104 slide in and are supported by guides 106 which guides are in turn anchored to the shell 72.

Figure 6:
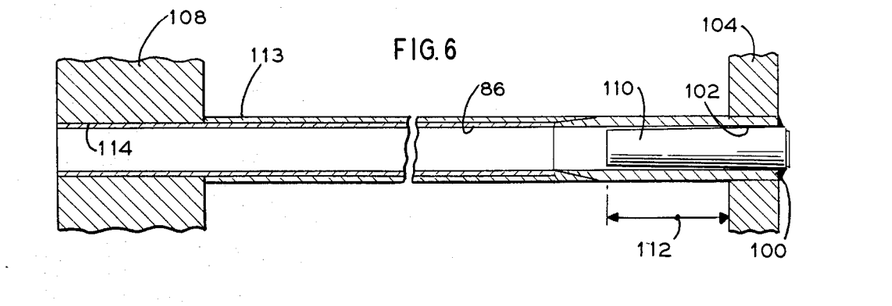
FIG. 6 is a longitudinal sectional view of a tube of the reheater shown in FIG. 5.

Referring to FIG. 6, one of the tubes 86 is shown opening into a header 92 and extending between the header tube sheet 108 and a support plate 104. In order to provide for expansions and contractions of the tubes and to simplify construction, it is preferred that only a few such as 100 tubes out of 5,000 be anchored to a support plate 104 so that the remainder of the tubes are free to expand and contract.

Each of the tubes 86 is closed by means such as plugging with plug member 110, it being preferable that they be plugged over a distance illustrated at 112 from the support plate 104 in a direction toward the respective header 92 of at least about 2 inches beyond the edge of the support plate 104 in order to prevent uneven heating of the support plate 104 and thereby reduce stresses from expansions and contractions. The tubes 86 are provided with suitable fins 113 along their length for improved heat transfer in accordance with conventional practice. However, in order to provide increased strength to the header tube sheets 108, the portions of the tubes 86 which are inserted and expanded into the tube sheets 108 are not provided with fins so that reduced diameter apertures 114 may be provided in the tube sheets 108 for insertion of tubes 86.

In accordance with this alternative embodiment, heating steam is provided to the inlet headers 92 through lines 116. This heating steam flows upwardly from the respective inlet header 92 into the tubes 86 which are in communication therewith and gives up heat in heat exchange relation to the main steam which is simultaneously flowing past the tubes 86. The heating steam in the tubes 86 is expected to continue giving up heat to the main steam until it condenses after which the condensate thus formed is expected to flow by gravity down along the walls of the tubes 86 and back to the respective inlet header 92, and the condensing of the steam is expected to result in lower pressures for drawing of more steam into the tubes. Thus, the steam is expected to become condensed, but not sub-cooled, for improved heat transfer efficiency. The condensate is then discharged from the inlet header 92 to a conventional vented surge tank (not shown) or other suitable condensate receiving apparatus through condensate removal lines 118.

Figure 7:
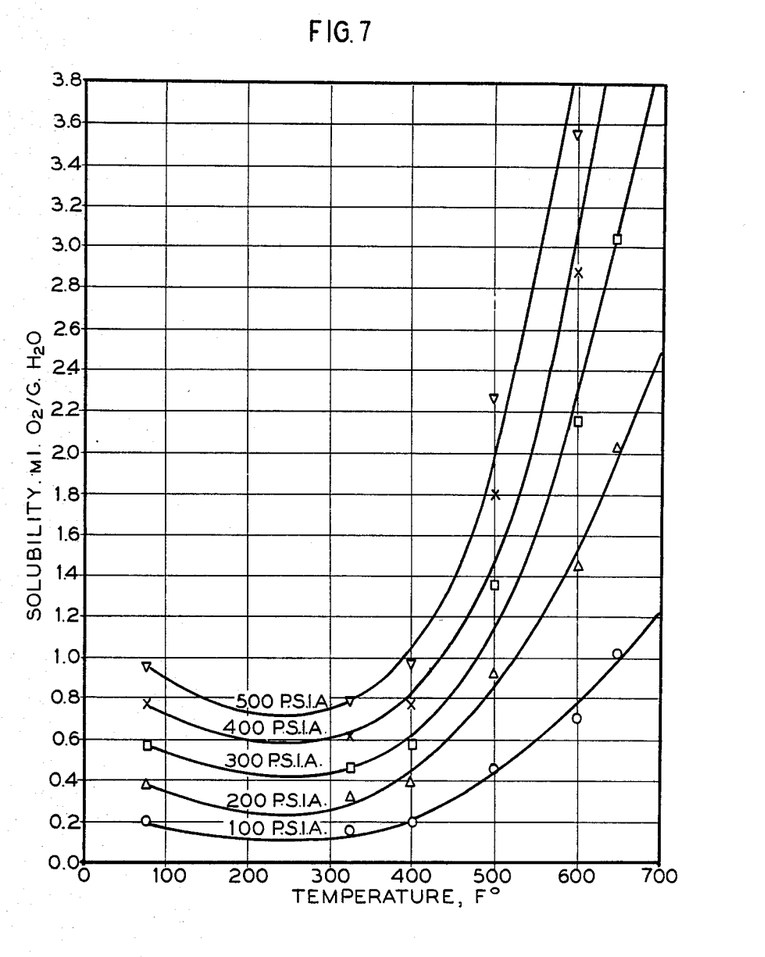
FIG. 7 is a graph showing the solubility of oxygen in water at various temperatures and pressures.
Figure 8:
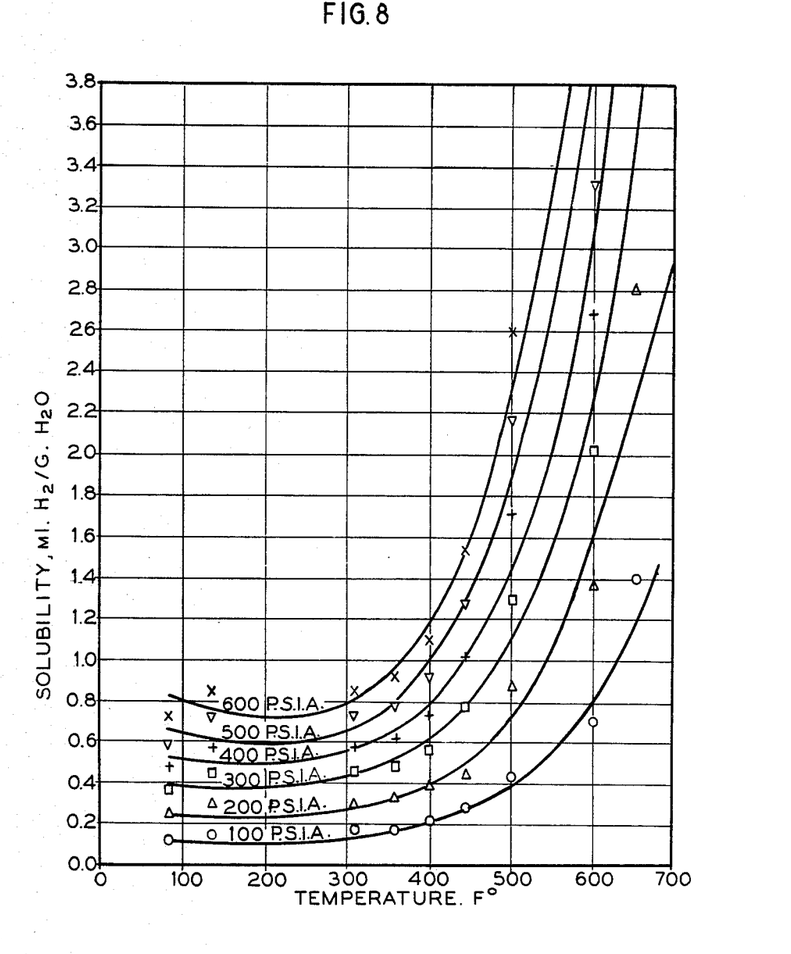
FIG. 8 is a graph, similar to FIG. 7, showing the solubility of hydrogen in water.
Figure 9:
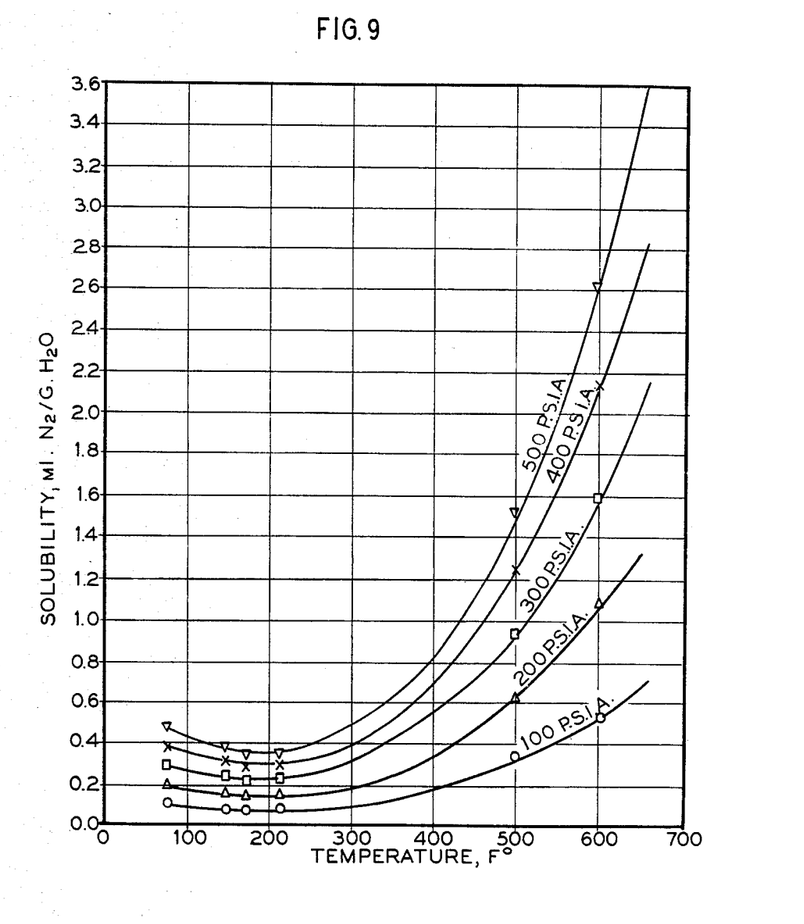
FIG. 9 is a graph, similar to that of FIG. 7, showing the solubility of nitrogen in water.

It is commonly understood that at low temperatures and pressures such as a pressure below 100 lbs. per sq. in. (7 kg. per sq. cm.) absolute in the 100° to 400° F. (38° to 204° C.) temperature range the condensing of steam in such closed end inclined tubes as shown in FIGS. 4, 5, and 6 is not feasible. Referring to FIGS. 7, 8, and 9, in which the temperature may be converted from the Farenheit scale to the Centigrade scale by subtracting 32° and multiplying the difference by five-ninths, in such a range of pressure and temperature, the concentrations of non-condensible gases such as oxygen, hydrogen, and nitrogen commonly found in the condensate are not sufficiently soluble in the condensate to prevent accumulation of undissolved gases in the tubes. Such an accumulation of gases will seriously impede heat transfer. For example, at a temperature of 400° F. (204° C.) and a pressure of 100 lbs. per sq. in. (7 kg. per sq. cm.) absolute, the solubility of oxygen in water is only 0.2 ml. per gr. However, it is believed that this difficulty will not be present in a superheater according to the present invention since the amount of dissolved gases in the reheat steam will usually be low and the high temperatures at which condensation will take place provide increased gas solubility in the condensate. Referring to FIGS. 7, 8, and 9, at the higher pressures and temperatures at which the apparatus 70 shown in FIGS. 4 and 5 will normally operate, the solubility of oxygen, hydrogen, and nitrogen in water is greater than about 0.7 ml. per gr. This is believed to be sufficient to prevent undesirable accumulation of non-condensable gases in the tubes 86.

Since the tubes 86 are relatively short (the length of each tube is less than the shell diameter which may typically be about 12 ft.), the rate of condensate flow is expected to be not more than about 25 lbs. (11 kg.) per hour from each tube 86. Such a flow rate would not require a significant portion of tube cross-section for a typical tube diameter of about one in. (2.5 cm.). Therefore, it is believed that "flooding" of the tubes 86 and the resulting loss of heat transfer efficiency will not normally occur.

In order to achieve a reduced pressure drop of the main steam between exhaust from the HP turbine 12 and the inlet to the LP turbine 16, the reheater 14 preferably is positioned adjacent the turbines 12 and 16, as illustrated in FIG. 1, to thereby reduce the pressure losses which would otherwise result from lengthy pipe runs. This position is distinguished from the locations of the nuclear steam generator and the fossil fuel-fired steam generator 20 which may be positioned remote from the turbines 12 and 16.

The heating vapor to be supplied to the tubes of an apparatus 14 in accordance with this invention is not limited to steam but may include other satisfactory vapors such as, for example, the vapors of organic fluids such as diphenyl oxide and silicone fluid. Neither is either of the apparatus 30 and 70 required to have two bundles of tubes. For example, this invention is meant to include a heat exchange apparatus having a single bundle of tubes.

In addition to reheating steam from a HP turbine such as an intermediate pressure turbine for delivery to a lower pressure turbine, either of the apparatus 30 and 70 may be utilized in accordance with this invention to superheat steam for other purposes such as superheating steam from a steam generator for delivery to a HP turbine.

Certain features of this invention may sometimes be used to advantage without a corresponding use of the other features. It is also to be understood that the invention is by no means limited to the specific embodiments which have been illustrated and described herein, and that various modifications may indeed be made within the scope of the present invention as defined by the claims.

I claim:

1. In a nuclear power plant including a steam turbine and a nuclear steam generator from which steam is discharged for driving the turbine, heat exchange apparatus having a generally cylindrical elongate shell extending horizontally between a pair of ends, inlet means for receiving the steam, outlet means for discharging the steam to the turbine, and means including at least one bundle of inclined tubes positioned in the flow path of the steam through the heat exchange apparatus and each of which has a length which is less than the shell diameter for providing a flow of vapor for transferring heat to the steam and for condensing the vapor in said tubes without sub-cooling it, each of said tubes opens into and extends in an upwardly direction from a header and lies in a vertical plane which is perpendicular to the vertical longitudinal centerplane of the shell, said header lies in said centerplane, said tube bundle comprises two banks of said tubes, and the angle at which each of the tubes of one of said banks extends relative to said centerplane is opposed to the angle at which each of the tubes of the other of said banks extends relative to said centerplane; and a fossil fuel-fired vapor generator for receiving condensate from said heat exchange apparatus, heating the condensate to generate vapor, and discharging the vapor to said tubes.

2. In a nuclear power plant according to claim 1 wherein each of said tubes has a closed upper end and has a lower end which opens into said header, and said header is connected to a source of vapor and a condensate drain.

3. A nuclear power plant according to claim 1 wherein said header is an outlet header which is connected to a condensate drain, the tubes of one of said banks terminate at and open into an inlet header, the tubes of the other of said banks terminate at and open into another inlet header, said inlet headers are connected to a source of vapor, and said inlet headers are disposed at the opposite ends of said respective tubes from said outlet header.

4. A nuclear power plant according to any one of claims 1 or 3 wherein said heat exchange apparatus is a reheater connected in the flow path of steam between a higher pressure turbine and a lower pressure turbine, and said heat exchange apparatus is positioned adjacent said turbines.

5. Apparatus according to claim 3 wherein said outlet header is suspended from said inlet headers, and the apparatus further comprises a member attached to said shell which slideably supports a member attached to each said inlet header.

6. In a power plant including a steam turbine and a steam generator from which steam is discharged for driving the turbine, apparatus for superheating the steam, the apparatus comprises a shell, inlet means in said shell for receiving the steam, outlet means in said shell for discharging the steam. a bundle of inclined tubes positioned in the flow path of the steam to provide a flow of vapor for transferring heat to the steam, each of said tubes has a closed upper end and has a lower end which opens into a header, and said header is connected to a source of vapor and a condensate drain, and the apparatus further comprises a support plate having a plurality of apertures into which at least some of said tube closed ends are inserted, and means including a plug member in at least one of said tubes and extending over a distance from said support plate in a direction toward said header of at least two inches beyond the edge of said support plate for preventing uneven heating of the support plate.

7. Apparatus according to claim 6 wherein said header includes tube sheets for insertion of end portions of said tubes, said tubes comprise fins which extend longitudinally of said tubes to said tube end portions, and said end portions are free of fins.

8. Apparatus according to claim 6 wherein the shell is generally elongate and extends horizontally between a pair of ends, said tube bundle comprises two banks of said tubes, each of said tubes lies in a vertical plane which is perpendicular to the vertical longitudinal centerplane of the shell, said header extends in a longitudinal direction of the shell and lies in said centerplane, and the angle at which each of the tubes of one of said banks extends relative to said centerplane is opposed to the angle at which each of the tubes of the other of said banks extends relative to said centerplane.

9. Apparatus according to claim 6 wherein at least one of said tube closed ends is free of anchoring to said support plate to thereby allow for expansions and contractions.

10. Apparatus according to any one of claims 1 or 6 further comprising a diffuser separator at said steam inlet means.

11. Apparatus according to claim 10 further comprising secondary separators disposed in the flow path of the steam between said diffuser separator and said bundle of tubes.

12. Apparatus according to claims 1, 6, or 7 wherein said two banks of tubes extend from said header in generally the configuration of a "V" as viewed in a cross-section of the apparatus taken in a plane perpendicular to the longitudinal axis of the apparatus, and the angle which each of said tubes forms with the vertical longitudinal centerplane of said shell is between about 30 and 60 degrees.

13. Apparatus according to any one of claims 6, 7, or 8 wherein each of said tubes has a length which is less than the diameter of said shell.

* * * * *